United States Patent [19]

Irmiger et al.

[11] 3,948,599
[45] Apr. 6, 1976

[54] NONCAKING, READILY SOLUBLE DYESTUFF GRANULATES OF ANIONIC DYESTUFFS

[75] Inventors: Ulrich Irmiger, Mettau; Zdenek Koci, Binningen, both of Switzerland

[73] Assignee: Ciba-Geigy Corporation, Ardsley, N.Y.

[22] Filed: Apr. 30, 1973

[21] Appl. No.: 355,840

[30] Foreign Application Priority Data
May 5, 1972 Switzerland.......................... 6758/72

[52] U.S. Cl.............................. 8/79; 8/25; 8/39 R; 8/41 R
[51] Int. Cl.². C09B 67/00; C09B 1/00; C09B 27/00
[58] Field of Search.......................... 8/79, 39, 41 R

[56] References Cited
UNITED STATES PATENTS

| | | | |
|---|---|---|---|
| 1,659,131 | 2/1928 | Bishop | 8/79 |
| 1,835,926 | 12/1931 | Bernhard | 8/79 |
| 3,336,155 | 8/1967 | Rowe | 8/79 |

FOREIGN PATENTS OR APPLICATIONS
443,998  3/1936  United Kingdom

OTHER PUBLICATIONS
Official Gazette, Vol. 814, May 11, 1965, pp. 363–364.
Chemical Technology of Dyeing and Printing by Diserens (1948), p. 9.

*Primary Examiner*—Leland A. Sebastian
*Assistant Examiner*—Donald P. Walsh
*Attorney, Agent, or Firm*—Joseph G. Kolodny; Edward McC. Roberts; Prabodh I. Almaula

[57] ABSTRACT

Dyestuff granulates of anionic dyestuffs are described, the said granulates containing anionic dyestuff, optionally together with a surface-active agent and/or further auxiliaries, dissolved in a melt of urea, which granulates are solid, non-dusty, noncaking, and very easily and rapidly soluble or dispersible even in cold water, and are particularly suitable for the production of aqueous dye preparations, which can be used for the dyeing and printing of the widest variety of materials.

3 Claims, No Drawings

NONCAKING, READILY SOLUBLE DYESTUFF GRANULATES OF ANIONIC DYESTUFFS

The invention relates to noncaking, readily water-soluble dyestuff granulates of anionic dyestuffs, as well as to processes for their production.

Most dyestuffs are sold commercially in the form of finely ground powders which to a lesser or greater extent are extremely dusty. Operating with such dusty dyestuff powders leads to an undesirable contamination of the surrounding area and of the personnel handling the said powders. It is therefore necessary to employ suitable protective equipment, such as, e.g. ventilation plants. The contamination of the atmosphere by dyestuff particles can moreover result in a soiling of nearby stored stainable materials, and thus render, for example, colourless textiles or textiles dyed in a single colour useless. Furthermore, very finely ground dyestuffs have a tendency to rapidly form lumps of dyestuff when stored in a moist atmosphere.

For a long time, therefore, processes have been known which are aimed at preventing the creation of dust by dyestuff powders. It is indeed possible by pressing or by granulating to process dyestuffs into a dust-free form; however, these preparations can possess properties differing from those of the starting materials. Thus, for example, powders compressed to form granulates, tablets or briquettes frequently possess poor dissolving or dispersing properties; consequently, the application of this process to dyestuffs has disadvantages. Most frequently recommended in practice, therefore, is the addition of wetting oils, or of appreciable amounts of hygroscopic liquids, such as glycerin. Applied singly, both methods are unsatisfactory, since, particularly in the case of intensely dusty powders, the creation of dust may be reduced but in no way eliminated, and the avoidance of lumpiness is difficult. The same applies also for the method of merely moistening powders with water. More recently, therefore, the mentioned measures have been applied in combination with other measures. Thus, polyvalent aliphatic alcohols, having hygroscopic properties, and water were used; or the powders were wetted with oils. However, these methods produce results which are not always satisfactory. The likewise known agglomeration of the powder particles by a moistening with steam in a turbulence zone results only in a reduction but not in an elimination of the formation of dust.

It is moreover often difficult to dissolve pulverulent anionic dyestuffs in water, since they do not readily wet, and form lumps when water is added. The preparation of dye liquors is thus rendered difficult and is frequently very time-consuming.

It has also been already suggested to commercially sell anionic dyestuffs in liquid form. These liquid commercial forms, however, also have their disadvantages, e.g. with regard to stability and to storage of the liquid preparations.

Finally, it is known from the published German patent application No. 1,619,375 to convert basic dyestuffs into a non dusty granulate form using a urea melt. However, due to the high temperature of the urea melt and the emission of ammonia from the urea melt, the dyestuffs may decompose.

It has now been found that dyestuff granulates of anionic dyestuffs can be obtained which do not possess the disadvantages mentioned, especially for the basic dyestuffs, if anionic dyestuffs are dissolved in the urea melt, and this melt is then allowed to cool.

By anionic dyestuffs are meant both dyestuffs containing acid groups, such as sulphonic acid groups, and metal-complex dyestuffs, such as 1:1- and 1:2-metal complexes, which can optionally contain fibre-reactive groups. The water-soluble anionic dyestuffs can belong to the most diverse chemical classes; they can be, for example, acid phthalocyanine, nitro, di- or triphenylmethane-, oxazine-, thiazine-, dioxazine- or xanthene dyestuffs, but specially anthraquinone dyestuffs, such as e.g. derivatives of 1-amino-2-sulpho-4-arylaminoanthraquinone, and azo dyestuffs of the monoazo, disazo or polyazo series. These azo dyestuffs can also contain metal bound in complex linkage, such as the 1:1-nickel, 1:1-cobalt, 1:1-copper or 1:1-chromium and, in particular, the symmetrical or asymmetrical 1:2-cobalt- or 1:2-chromium-complexes of o-carboxy-o'-hydroxy- or, in particular, o,o'-dihydroxyazo dyestuffs of the benzene-azo-benzene, naphthalene-azo-naphthalene, benzene-azo-naphthalene, benzene-azo-pyrazole or benezene-azo-acetoacetic acid amide types. Particularly suitable for this process are 1:1-metal-complex dyestuffs, or also fibre-reactive anionic dyestuffs.

It is advantageous to add surface-active agents to the urea melt. Suitable surface-active agents are nonionic compounds as well as anion-active compounds.

In order to improve the properties of the granulates, e.g. when employed in dyebaths, it has been found advantageous to add surface-active agents. These improve the stability of the dyebaths, the distribution of the dyestuff and the solubility as well as the speed of solubility of the granulates.

Non-ionic surface-active agents which may be mentioned as being suitable are, in particular, polyglycol ethers such as alkylpolyglycol ether, or alkylphenolpolyglycol ether such as octylphenolpolyglycol ether, and fatty acid polyglycol ether.

Anion-active surface-active agents are, e.g. fatty acids such as lauric acid, myristic acid, palmitic acid, stearic acid, oleic acid, or mixtures thereof, such as, e.g. are contained in coconut oil acids and palm-kernel oil acids; naphthenic acids; resinic acids such as colophonium; bile acids; and then the most varied sulphates, for example, sulphated primary aliphatic alcohols having 10 to 18 carbon atoms, such as sodium decyl, sodium lauryl, sodium myristyl and sodium oleyl sulphates, or sulphates secondary aliphatic alcohols; also sulphates unsaturated fatty acids, fatty acid ethers or sulphates fatty acid amides, sulphates alkylene oxide adducts, sulphated partially esterified, polyvalent alcohols; and particularly the sulphonates such as alkyl sulphonates, for example, lauryl sulphonate, cetyl sulphonate, stearyl sulphonate, petroleum sulphonates, naphthene sulphonates, olefine sulphonates, Mersolates, sodium dialkyl sulphosuccinates such as sodium dioctylsulphosuccinate and laurides such as oleylmethyllauride (sodium salt), alkylarylsulphonates, such as alkylbenzene sulphonates with a straight-chain or branched alkyl chain having about 7 to 20 carbon atoms, and monoalkyl and dialkylnaphthalene sulphonates such as nonylbenzene sulphonate, dodecylbenzene sulphonate and hexadecylbenzene sulphonate, as well as 1-isopropylnaphthalene-2-sulphonate, di-isopropylnaphthalene sulphonate, di-n-butylnaphthalene sulphonate, diisobutylnaphthalene sulphonate, condensation products of naphthalene-sulphonic acid and formaldehyde, such as dinaphthylmethane-disulphonate, then lignin sulphonates and oxylignin sulphonates, sulphonates of polycarboxylic acid esters and -amides, and condensation products of fatty acids with aminoalkyl sulphonates, moreover phosphated surface-active agents such as mono- and diphosphate esters of oxyethylated fatty alcohols, alkylphenols and fatty acids.

Apart from these surface-active agents, it is also possible to add other auxiliaries. These serve to lower the melting point of the urea, improve the stability of the aqueous solutions, aid the adjustment of the pH and improve the solubility of the dyestuff in water. Suitable auxiliaries are, for example: water, thiourea, benzoic acid, maleic acid and formic acid.

For the actual production of the dyestuff granulates according to the invention, it is advantageous to dissolve the dry anionic dyestuff, and optionally the surface-active agent and further auxiliaries, in a melt of urea, and to subsequently allow this melt to solidify by known methods such as, for example, by spraying or flaking the urea melt.

Instead of commencing with dry anionic dyestuffs, it is also possible to start with moist dyestuffs, such as with dyestuff press cakes. It is advantageous in this case to add to the dyestuff press cake the urea and optionally the surface-active agent and the further additions, and to then distill off water, optionally under reduced pressure, from the homogeneous solutions formed, so that a viscous melt is obtained, which solidifies on cooling. This is subsequently converted into granulates.

A rapid solidification of the melt is preferred, for a crystallising out of the dyestuff in the cooling melt is consequently avoided.

The melts resulting from the combining of the anionic dyestuff and urea, as well as optionally the surface-active agent and further auxiliaries, can be poured, e.g. into moulds, and after cooling reduced to small pieces. The moulds can be so designed that the shaped articles, such as slabs or spheres, have a specific weight, and are thus suitable for the dosing of precise amounts of dyestuff. With regard to the breaking down of the melt into small pieces, it is advantageous, for example, to produce flakes, since these, by virtue of their large surface-area, readily and rapidly dissolve.

The dyestuff granulates according to the invention - and these include large-sized granulates having a high specific weight - are preferably composed of:

1 to 80 percent by weight of at least one anionic dyestuff, especially a dyestuff containing sulpho groups, or a metal-complex dyestuff, 20 to 99 percent by weight of urea, optionally 1 to 5 percent by weight of a surface-active agent, particularly an anion-active one, such as dioctyl sulphosuccinate (sodium salt), and optionally 5 to 60 percent by weight of other auxiliaries, particularly thiourea, as well as optionally small amounts of water.

The dyestuff granulates according to the invention are solid, non-dusty, noncaking, and very easily and rapidly soluble or dispersible even in cold water. These granulates are practically solid solutions of anionic dyestuffs in urea, which consequently contain an ideal fine dispersion of the dyestuff.

The new dyestuff granulates are particularly suitable for the production of aqueous dye preparations, which can be used for the dyeing and printing of the widest variety of materials.

The following examples illustrate the invention without limiting the scope thereof. Parts are expressed by weight and temperatures in degrees Centigrade.

EXAMPLE 1

70 Parts of urea are melted in a beaker. 30 Parts of the dyestuff of the formula

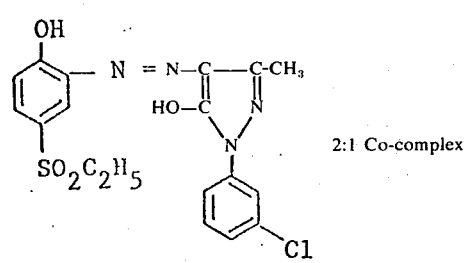

are then added at 150° to the melt.

After about 5 minutes stirring, the dyestuff is completely dissolved in the melted urea. The dye melt remains thinly liquid. It is poured out onto a metal sheet and allowed to solidify. Before the melt has fully hardened it is pressed through a sieve to obtain elongated granules ca. 5 mm in length. These are free from dust, very easy to handle, and dissolve immediately in water.

If there are additionally added to the melt, 2 parts of a surface-active agent, particularly of an anion-active surface active agent such as dioctyl sulphosuccinate, with otherwise the same procedure, then dyestuff granulates having even better dissolving properties in water are obtained.

If identical amounts of the following dyestuffs are used instead of the dyestuff of the above formula, the procedure otherwise being the same, then dyestuff granulates possessing equally good properties are obtained.

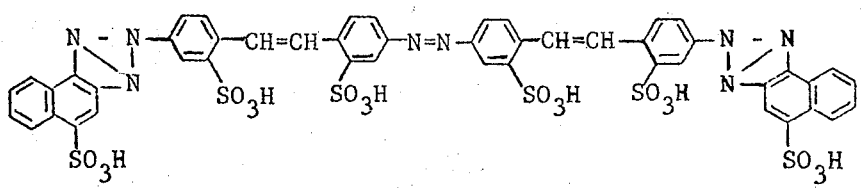

EXAMPLE 6

10 Parts of the dyestuff of the formula

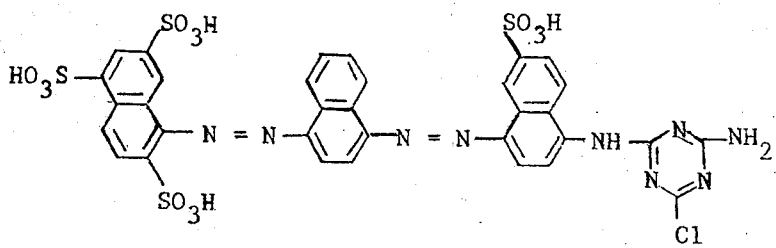

are weighed into a beaker, together with 24 parts of urea and 16 parts of thiourea. The mixture is then heated in an oil bath. At 110° a homogeneous dye melt is obtained which after about 5 minutes is poured out onto a metal sheet and allowed to solidify. Before the melt has fully hardened, it is pressed through a sieve to obtain elongated granules ca. 5 mm in length. These are free from dust, very easy to handle, and dissolve rapidly in water.

If instead of the 10 parts of the above-given dyestuff 10 parts of the dyestuff of the formula

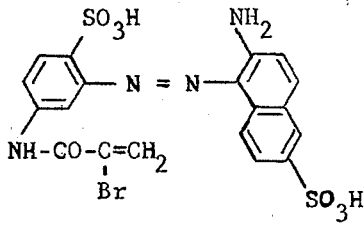

is used, with otherwise the same procedure, then dyestuff granulates are obtained possessing equally good properties.

What we claim is:

1. Solid non-dusty, noncaking, readily water soluble dyestuff granulates of anionic dyestuffs, the said granulates containing at least one anionic dyestuff, optionally together with a surface-active agent and/or further auxiliaries, dissolve in a melt of urea and wherein said granulates contain 1 to 80 percent by weight of said at least one anionic dyestuff, 20 to 99 percent by weight of said urea, and optionally 1 to 5 percent by weight of said surface-active agent, and optionally 5 to 60 percent by weight of said further auxiliaries.

2. Solid, non-dusty, noncaking, readily water soluble dyestuff granulates according to claim 1 which contain, as surface-active agent, an anion-active surface-active agent, particularly dioctyl sulphosuccinate, and as other auxiliary, thiourea and/or small amounts of water.

3. Solid, non-dusty, noncaking, readily water soluble dyestuff granulates according to claim 1 which contain, as anionic dyestuff, a dyestuff containing sulphonic acid groups, or a metal-complex dyestuff.

* * * * *